United States Patent [19]
Clancy

[11] 3,834,418
[45] Sept. 10, 1974

[54] CONTROL VALVE

[75] Inventor: James Roger Clancy, Stockport, England

[73] Assignee: Henry Simon Limited, Stockport, Cheshire, England

[22] Filed: May 18, 1973

[21] Appl. No.: 361,448

[30] Foreign Application Priority Data
June 21, 1972 Great Britain............... 29179/72

[52] U.S. Cl.............................. 137/625.48, 137/610
[51] Int. Cl............................................. F16k 11/06
[58] Field of Search ...... 137/625.48, 609, 610, 611, 137/615, 616, 616.3, 616.5; 251/202, 203, 204, 158

[56] References Cited
UNITED STATES PATENTS

| 653,600 | 7/1900 | Wiley | 251/203 X |
| 721,743 | 3/1903 | Richmond | 137/610 X |
| 1,681,328 | 8/1928 | Erickson | 137/625.48 |
| 2,252,141 | 8/1941 | Seidel et al. | 137/625.48 |
| 2,557,460 | 6/1951 | Ott | 137/625.48 |
| 2,624,364 | 1/1953 | Detlefsen | 137/609 |
| 2,898,932 | 8/1959 | Tefs | 137/625.48 X |
| 3,395,731 | 8/1968 | Kauffman | 137/610 |

Primary Examiner—William R. Cline
Assistant Examiner—Ira S. Lazarus
Attorney, Agent, or Firm—Norris & Bateman

[57] ABSTRACT

A fluid flow control valve of the kind having a single port which is to be connected selectively to one or other of a pair of ports, said valve comprising a ported member connected to said single port by a flexible duct, said member being movable between two positions thus to be aligned with one or other of said pair of ports, means being provided for effecting automatically a seal between said member and a respective one of said ports when said alignment takes place, said member being movable preferably linearly across a surface containing said pair of ports, and said sealing means is arranged to force the member against said surface as it approaches alignment with said port.

15 Claims, 2 Drawing Figures

CONTROL VALVE

This invention relates to a fluid flow control valve of the kind (hereinafter termed of the kind referred to) having a single port which is to be connected selectively to one or other of a pair of ports.

According to the present invention a fluid flow control valve of the kind referred to comprises a ported member connected to said single port by a flexible duct, said member being movable between two positions thus to be aligned with one or other of said pair of ports, means being provided for effecting automatically a seal between said member and a respective one of said ports when said alignment takes place.

The invention will become further apparent from the following description with reference to the accompanying drawings which illustrate, by way of example only, one form of control valve embodying the invention.

Figure 1:
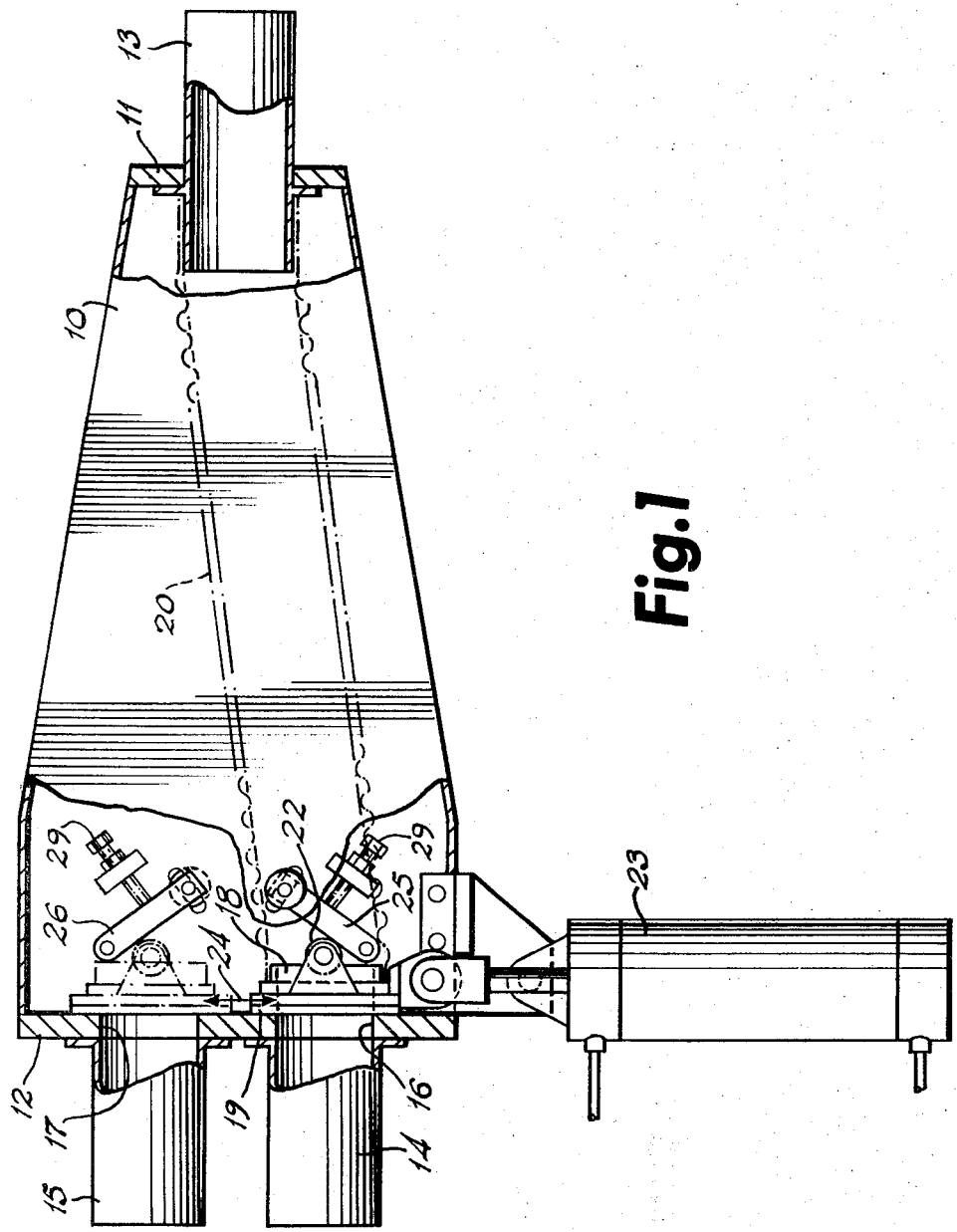
FIG. 1 is a part-sectional elevation of the valve.

Referring now to the drawings, the valve comprises a housing 10 having end plates 11 and 12 respectively. An inlet port or duct 13 is fixedly mounted on, and extends through, the plate 11. Outlet ports or ducts 14 and 15 are fixedly mounted on the outer face of the plate 12 and are aligned with spaced apertures 16 and 17 therein respectively.

A ported member 18 having a sealing surface 19, of for example a polyurethane rubbing strip, on one face thereof is connected to, and communicates with, the inlet duct 13 by means of a flexible duct or tube 20. Attached to one side of the member 18 by means of a bracket 21 is a roller 22, whose purpose is to be described.

Figure 2:
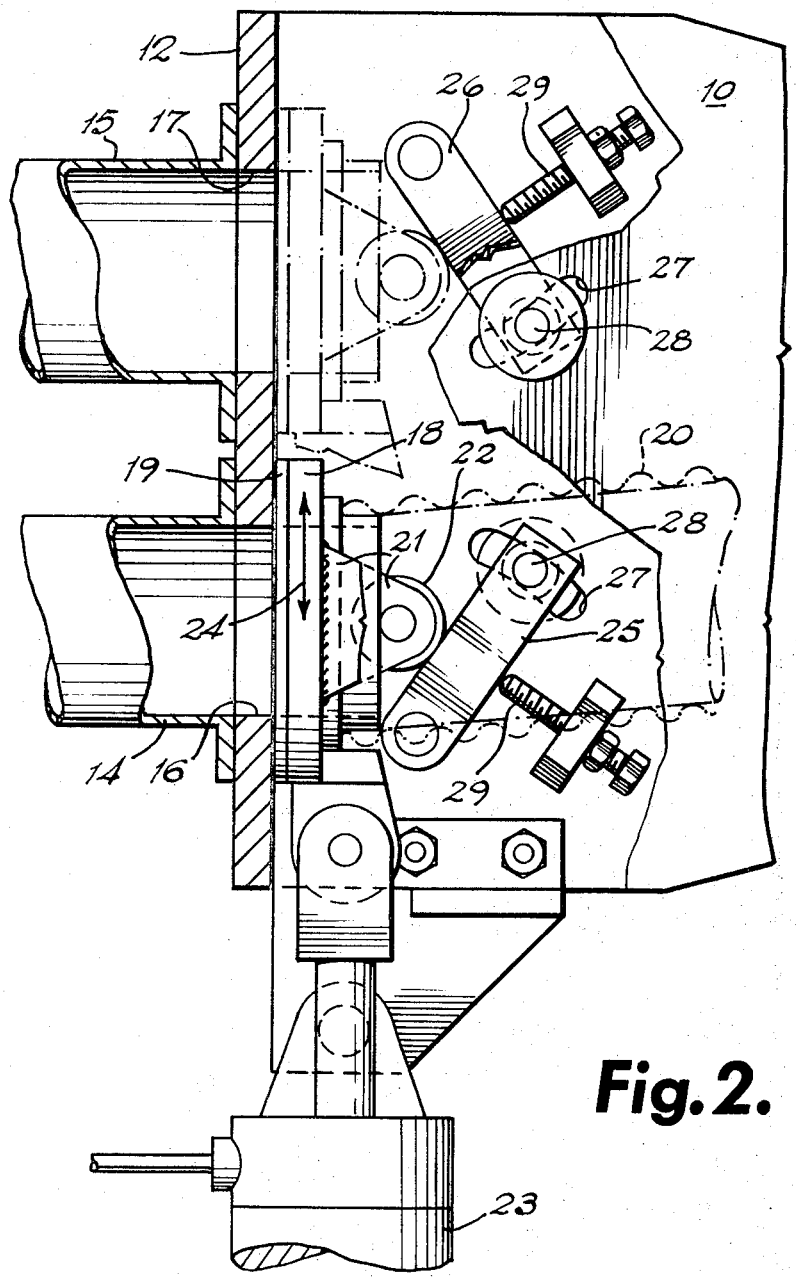
FIG. 2 is a view similar to FIG. 1 of part of the valve, on an enlarged scale.

As shown in FIG. 2 member 18 is secured upon an end of the longitudinally flexible tube 20.

The member 18 is connected to a pneumatic or hydraulic actuating ram 23 for linear movement across the inner face of the plate 12 as indicated by the arrows 24.

Adjacent the apertures 16, 17 and within the housing 10 there are pivotally mounted a pair of cam arms 25 and 26 respectively each pivotally mounted at one end and having a permitted degree of pivotal movement determined by a slot 27 in the wall of the housing 10, in which runs a pin 28 attached adjacent the other end of the arm. The degree of pivotal movement is further controlled by adjusting screws 29.

In use, with the parts disposed as shown in FIG. 1, fluid supplied to the inlet duct 13 is transmitted via the flexible tube 20 and the member 18, through the aperture 16 to the outlet duct 14. The member 18 is held in sealing engagement with the inner surface of the plate 12 around the aperture 16 by the action of the roller 22 abutting one edge of the adjacent cam arm 25 serving as a ramp whose further movement is prevented by the associated adjusting screw 29. Upon actuation of the ram from the position shown, the member 18 is moved linearly across the inner surface of said plate 12 towards the aperture 17. As this movement commences the roller 22 moves away from the cam arm 25 and member 18 is thus freed to slide along the inner surface of the plate 12. When the roller 22 strikes the other cam arm 26 the member 18 is again forced into sealing engagement with said inner surface adjacent the aperture 17. In this position, therefore, fluid supplied to the duct 13 is transmitted via the tube 20 to the duct 15. If required switch means (not shown) may be provided and adapted to be actuated when the member 18 is in one or both of its operative positions so as to provide an indication by means of an indicator lamp or the like of the direction of flow of fluid through the valve.

It will be appreciated that the construction and mode of operation of the valve is simple and inexpensive whilst providing a positive changeover facility. The valve is particularly applicable for use in pneumatic conveying equipment wherein solid particulate materials are conveyed along ducts by a stream of moving air flowing therethrough.

It is not intended to limit the invention to the details heretofore described, many variations, such as might readily occur to one skilled in the art, being possible without departing from the scope of the invention.

For example, although the valve would normally be used to control the direction of flow of fluid in the manner described it is envisaged that the ducts 14, 15 could constitute inlets, the duct 13 serving as a single outlet which thus would be supplied with fluid from one of two sources as required.

Furthermore the shape of the housing 10 and the relative dispositions of end walls 11 and 12 can be other than that illustrated and described. For example, the housing may include one wall containing all three ports and, if required, the wall or wall section containing said pair of ports can be curved, said ported member thus following a correspondingly curved path between said ports.

What is claimed is:

1. A fluid flow control valve of the kind having a single port which is to be connected selectively to one or other of a pair of ports, said valve comprising a ported member connected to said single port by a flexible duct, means for moving said member between two positions wherein it is aligned with one or other of said pair of ports, and cam means automatically actuated when alignment takes place for exerting a positive force on said ported member in the direction of the respective one of said ports with which it is aligned for effecting a seal between said member and said respective one of said ports.

2. A fluid flow control valve according to claim 1, wherein said seal effecting means comprises a pair of ramps disposed one adjacent each of said pair of ports and engageable by said ported member.

3. A fluid flow control valve according to claim 2, wherein said ported member includes a roller adapted to engage one of said ramps as said member approaches a position of alignment with the associated one of said ports.

4. A fluid flow control valve according to claim 1, wherein said single port and said pair of ports are arranged in one or more walls of a housing surrounding same, within which said ported member and said flexible duct are disposed.

5. A fluid flow control valve according to claim 4, wherein said housing comprises a pair of end walls, and side walls, one of said end walls containing said single port, the other containing said pair of ports, said flexible duct being connected to one end to said single port and extending along and within said housing, said ported member being connected to the other end of said duct and movable linearly across said other end wall between two positions aligned respectively within said pair of ports.

6. The valve defined in claim 1 wherein said ported member is mounted on an end of said flexible tube and said seal effecting means comprises cam means operatively engaged by said member when alignment takes place.

7. The valve defined in claim 6, wherein said cam means comprises a stationary inclined face and a follower roller on said member is adapted to engage and move along said face as said member moves into alignment position.

8. 10. valve defined in claim 7 wherein means is provided for adjusting the cam means to vary the inclination of said face.

9. The valve defined in claim 1 wherein said pair of ports are contained in means providing a substantially continuous surface, and said ported member is slidable along said surface during movement between said positions.

10. A fluid flow control valve according to claim 9, wherein said ported member is provided with a sealing surface on one face thereof adapted to seal against a surface portion surrounding each of said pair of ports.

11. The valve defined in claim 9 wherein said surface is substantially flat and a fluid pressure motor is connected to move said ported member linearly along said surface between said alignment positions.

12. A fluid flow control valve of the kind having a single port which is to be connected selectively to one or other of a pair of ports, said valve comprising a ported member connected to said single port by a flexible duct, said member being movable between two positions thus to be aligned with one or other of said pair of ports, and means for effecting automatically and maintaining a seal between said member and a respective one of said ports when said alignment takes place, said seal effecting means comprising a pair of oppositely inclined ramps disposed one adjacent each of said pair of ports and engageable by said ported member in the respective alignment positions.

13. The fluid flow valve defined in claim 12 wherein each said ramp comprises an arm pivotally mounted at one end and having a permitted degree of pivotable movement which is adjustable thus to effect proper alignment and sealing of said ported member.

14. A fluid flow control valve of the kind having a single port which is to be connected selectively to one or other of a pair of ports, said valve comprising a ported member connected to said single port by a flexible duct, said member being movable between two positions thus to be aligned with one or other of said pair of ports, means being provided for effecting automatically a seal between said member and a respective one of said ports when said alignment takes place, said ported member being slidably movable across a surface containing said pair of ports and said sealing means being arranged to force said member against said surface when said alignment takes place, and said sealing means comprising a pair of oppositely inclined ramps disposed one adjacent each of said pair of ports and engageable by said ported member in the respective alignment positions.

15. A fluid flow control valve defined in claim 14, wherein each said ramp comprises an arm pivotally mounted at one end and having a permitted degree of pivotable movement which is adjustable thus to effect proper alignment and sealing of said ported member.

* * * * *

UNITED STATES PATENT OFFICE
CERTIFICATE OF CORRECTION

Patent No. 3,834,418    Dated September 10, 1974

Inventor(s) James Roger Clancy

It is certified that error appears in the above-identified patent and that said Letters Patent are hereby corrected as shown below:

Column 3, line 14, change "10" to
--The--

Signed and sealed this 24th day of December 1974.

(SEAL)
Attest:

McCOY M. GIBSON JR.
Attesting Officer

C. MARSHALL DANN
Commissioner of Patents